No. 699,077. Patented Apr. 29, 1902.
C. CHRISTENSEN.
ADJUSTABLE CULTIVATOR ARCH.
(Application filed Jan. 28, 1902.)
(No Model.)
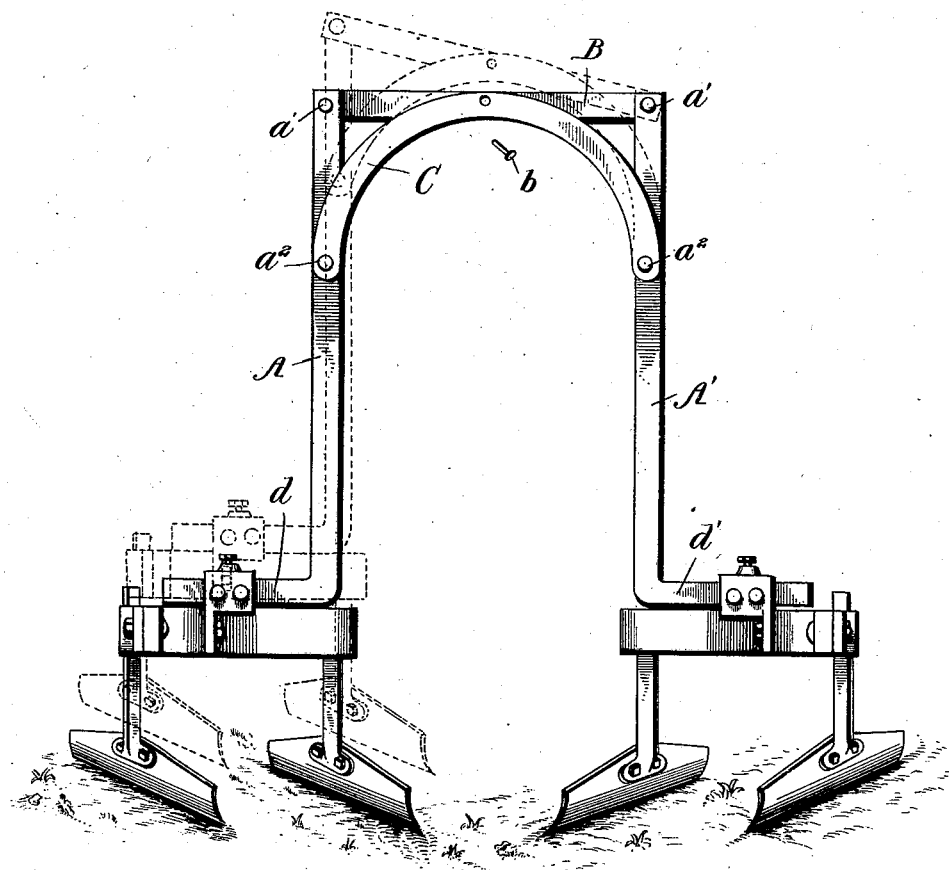
WITNESSES:
Geo. P. Kingsbury.
Edw. W. Byrn.
INVENTOR
Carl Christensen.
BY Munn & Co.
ATTORNEYS

UNITED STATES PATENT OFFICE.

CARL CHRISTENSEN, OF CLIFTON, ILLINOIS.

ADJUSTABLE CULTIVATOR-ARCH.

SPECIFICATION forming part of Letters Patent No. 699,077, dated April 29, 1902.

Application filed January 28, 1902. Serial No. 91,589. (No model.)

*To all whom it may concern:*

Be it known that I, CARL CHRISTENSEN, of Clifton, in the county of Iroquois and State of Illinois, have invented a new and useful Improvement in Adjustable Cultivator-Arches, of which the following is a specification.

My invention is in the nature of an improvement on that part of a cultivator-frame which is made in twin sections that straddle a row of plants and are connected by an elevated arch in the middle and have attached to the foot of each leg the shovels that scrape the soil on each side of the row of plants.

It relates to that form of cultivator-arch in which the shovels on the opposite side have an independent up-and-down movement; and it consists in such an improved and simplified construction of twin cultivator-arch as will allow the cultivator to be tilted to one side and either foot of the arch raised without tilting the other foot, as will be hereinafter more fully described.

The figure is a rear view of the cultivator-arch with the shovels and their supporting-bars attached to the feet of the arch.

In the drawing, A A' represent the two legs of the cultivator-frame, each of which has at the bottom an outturned foot $d$ $d'$. To the tops of the two legs A A' is loosely pivoted at $a'$ and $a'$ a horizontal cross-bar B. To the two legs A A' at some distance below their upper ends is pivoted at $a^2$ and $a^2$ the lower ends of an arched brace C. This brace is arched, as shown, so as to give more room for the growing plants below it; but its real function is, with the cross-bar B, to convert the legs A and A' into parallel-motioned bars, which as one of the legs and its shovels rise or fall always hold the legs parallel to each other, and consequently the feet $d$ and $d'$ horizontal, irrespective of the height to which either one of them may be raised. It will therefore be seen that the arched character of the bar C is not essential; but if the legs were made long enough the bar C might be straight and parallel with B. By making it arched, however, I get not only more room for the plants, but the top of the arch is brought up to the level of bar B, and both are perforated with a hole into which a pin $b$ may be placed to convert the automatically-adjustable cultivator-arch into a rigid arch when desired.

It will be seen that the lower part of the legs A and A' are formed in one piece with the outturned feet $d$ and $d'$, which extend horizontally far enough to receive clamps that hold the horizontal bars carrying the shovels, and that this construction permits the shovel-bars and shovels to be adjusted horizontally on these feet to increase or diminish the space between the shovels on one side and the shovels on the other side, thus making a very simple, strong, and compact arrangement. With such a construction the following advantages are obtained in a very simple and practical manner, viz:

The person operating the cultivator may lift one set of shovels over an obstruction while the other set remains at work in the ground. When one shovel is so lifted, as shown in dotted lines, the shovels remaining at work in the ground maintain a horizontal position instead of being slanting to one side, as with the old-style rigid arches.

Where the ground is uneven and higher under one shovel than under the other, each shovel will adapt itself to the height of the ground under it independently of the other.

When one shovel is raised to such a height above the other as is usual in actual use, the horizontal distance apart remains practically the same.

Having thus described my invention, what I claim as new, and desire to secure by Letters Patent, is—

1. A twin cultivator-frame, comprising vertical legs, formed at their bottom ends with outturned horizontal portions for receiving the clamps of the shovel-bars, a cross-bar loosely joined to the upper ends of said legs, and another cross-bar loosely connected to the said legs at points below their upper ends substantially as shown and described.

2. A twin cultivator-frame, comprising vertical legs formed at their bottom ends with outturned horizontal portions, adjustable clamps secured upon said outturned portions, shovel-bars carrying shovels and held in said clamps, and two loosely-jointed bars connected to the tops of the legs for a parallel motion of the legs substantially as described.

3. A twin cultivator-frame having vertical legs, a cross-bar loosely joined to their upper ends, and an upwardly-curved arch-bar having its lower extremities loosely joined to the said legs of the cultivator-frame, said cross-bar and arch-bar having coinciding holes, and a locking-pin extending through the same to lock the parts rigidly together substantially as described.

CARL CHRISTENSEN.

Witnesses:
 LOREN JENSEN,
 L. E. VANSANT,
 M. H. SCOTT.